United States Patent
Barnard

[15] 3,703,206
[45] Nov. 21, 1972

[54] THERMAL REGENERATORS

[72] Inventor: Mark Cary Sedgwick Barnard, Kenilworth, England

[73] Assignee: Leyland Gas Turbines Limited, Solihull, England

[22] Filed: July 6, 1971

[21] Appl. No.: 159,925

[30] Foreign Application Priority Data

Aug. 15, 1970  Great Britain........39461/70

[52] U.S. Cl. .................165/9, 277/43, 277/88, 277/96
[51] Int. Cl. ............................................F28d 19/04
[58] Field of Search.......165/9; 277/42, 43, 88, 96 R, 277/96 A

[56] References Cited

UNITED STATES PATENTS

| 2,398,783 | 4/1946 | Gilbert, Sr. | 277/96 R X |
| 2,980,452 | 4/1961 | Cahill et al. | 277/42 |
| 3,234,999 | 2/1966 | Atwood | 165/9 |

Primary Examiner—Albert W. Davis, Jr.
Attorney—Holcombe, Wetherill & Brisebois

[57] ABSTRACT

A thermal regenerator of the kind having a rotary disc-type matric enclosed in a casing traversed by two segregated flows of gaseous heat-exchanging fluids is equipped with an annular flexibly mounted counter-face sealing element which makes rubbing contact with the corresponding face of the matrix, and which, in cross-section, has an asymmetric profile tapering from maximum thickness adjacent to the high-pressure side of the sealing element to minimum thickness at the low-pressure side.

3 Claims, 1 Drawing Figure

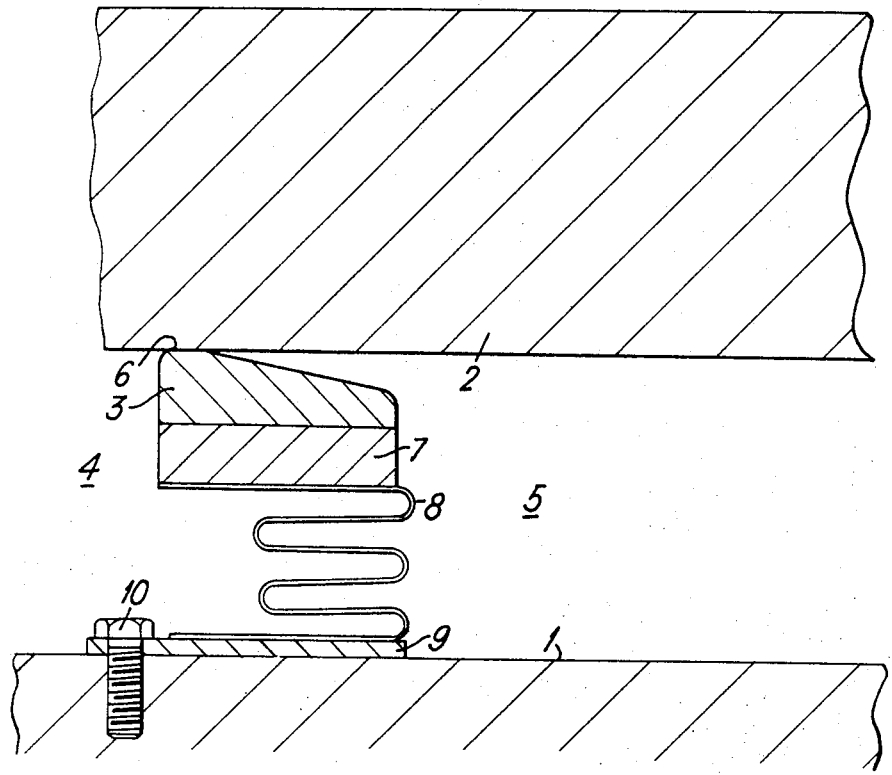

THERMAL REGENERATORS

This invention relates to thermal regenerators (otherwise known as regenerative heat-exchangers) of the kind employing a moving matrix, e.g. a rotary disc-type matrix.

Thermal regenerators of the kind referred to are usually incorporated in gas turbine power plants to extract heat from the exhaust gases, and to transfer it to the compressed intake-air before this enters the combustion chamber of the gas turbine engine. The rotary disc-type matrix normally employed, which is housed in the casing of the engine, comprises a foraminous refractory core (e.g. of ceramic or glass-ceramic material) formed with a multitude of open-ended, thin-walled passages lying substantially parallel to its rotational axis. Sector-like zones of the core are caused (by its rotation) to be presented alternately to the flow of the exhaust gases and to the flow of the compressed intake-air. In that way the required heat transference is effected.

It is, of course, necessary to segregate the two gaseous flows at all times, and to minimize leakage between the high-pressure zone, occupied by the compressed intake-air, and the low-pressure zone occupied by the exhaust gases. The usual practice is to employ an annular sealing element which makes rubbing contact with the corresponding face of the matrix, and which is mounted on a flexible member fixed to the casing of the engine. The intended purpose of the flexible member is to maintain contact between the matrix face and the counterface of the sealing element despite differential movements that occur between the engine casing and the matrix under operating conditions, and despite wear of the counterface of the sealing element.

It is convenient to mount the sealing element on a support ring which is secured to the flexible member. The support ring itself is sufficiently flexible around its periphery to accommodate general distortions, but is less able to accommodate local distortion (particularly when this occurs across the sealing counterface).

According to this invention a thermal regenerator, of the kind having a rotary disc-type matrix enclosed in a casing which is traversed by two segregated flows of gaseous heat-exchanging fluids, is equipped with an annular flexibly mounted counterface sealing element which makes rubbing contact with the corresponding face of the matrix, and which, in cross-section, has an asymmetric profile tapering from maximum thickness adjacent to the high-pressure side of the sealing element to minimum thickness at the low-pressure side. This purposeful configuration of the sealing element not only assists its bedding-in process but also conduces to more uniform seal-loading, and reduces the overall rate of wear.

With the improved design of sealing element, the seal-loading is high where initial peripheral contact occurs. As wear takes place, the load per unit area (and hence the rate of wear) is reduced for two reasons; namely, (a) because the actual rubbing area has increased, and (b) because the high-pressure area of the pressure profile under the seal has increased, thus reducing the total load on the seal. Consequently, the seal is endowed with its own pressure-balancing propensity, and its rate of wear becomes low when the bedding-in process has been completed.

The accompanying drawing is a schematic fragmentary sectional plan view exemplifying how a sealing element in accordance with the invention is applied to a rotary-disc regenerator of a gas turbine engine.

In the embodiment illustrated, a gas turbine engine has its casing 1 arranged to enclose a rotary disc-type matrix 2 of a thermal regenerator. When the engine is running, two segregated flows of gaseous heat-exchanging fluids traverse the casing 1, and hence also the thermal regenerator. The latter is equipped with a flexibly mounted counterface sealing element 3 of annular form, which makes rubbing contact with the corresponding face of the matrix 2. The sealing element 3 is made of nickel oxide.

In cross-section, the sealing element 3 has an asymmetric profile and, as shown, is of substantially wedge-like shape. It tapers from maximum thickness adjacent to the high-pressure low-temperature side (i.e. zone 4) of the sealing element 3 to minimum thickness at the low-pressure high-temperature side (i.e. zone 5). Adjacent to its thicker outer periphery, which is at zone 4, the sealing element 3 has a small flat 6 at its maximum thickness where initial peripheral contact with the matrix face occurs.

The sealing element 3 is mounted on a support ring 7, of ferritic steel, which is fixed to one end of a convoluted annular flexible sheet metal member 8; the other end of this flexible member being firmly attached to the engine casing 1 by means of an intervening annular plate 9 which is bolted (as at 10) to the casing 1. The preferred material for the member 8 is the nickel-based alloy known as "Nimonic 75". ("Nimonic" is a Trade Mark).

I claim:

1. A thermal regenerator of the kind having a rotary disc-type matrix enclosed in a casing which is traversed by two segregated flows of gaseous heat-exchanging fluids; characterized by being equipped with an annular flexibly mounted counterface sealing element which makes rubbing contact with the corresponding face of the matrix, and which, in cross-section, has an asymmetric profile tapering from maximum thickness adjacent to the high-pressure side of the sealing element to minimum thickness at the low-pressure side.

2. A thermal regenerator according to claim 1, in which the sealing element is of substantially wedge-like shape in cross-section and, adjacent to its thicker outer periphery at the high-pressure side, has a small flat at its maximum thickness where initial peripheral contact with the matrix face occurs.

3. A thermal regenerator according to claim 1, in which the sealing element is mounted on a support ring which is fixed to one end of a convoluted annular flexible sheet metal member that has its other end firmly attached to the engine casing.

* * * * *